July 23, 1957  R. A. AMMON  2,800,553
MOVING COIL MECHANISM
Filed May 2, 1955  3 Sheets-Sheet 2

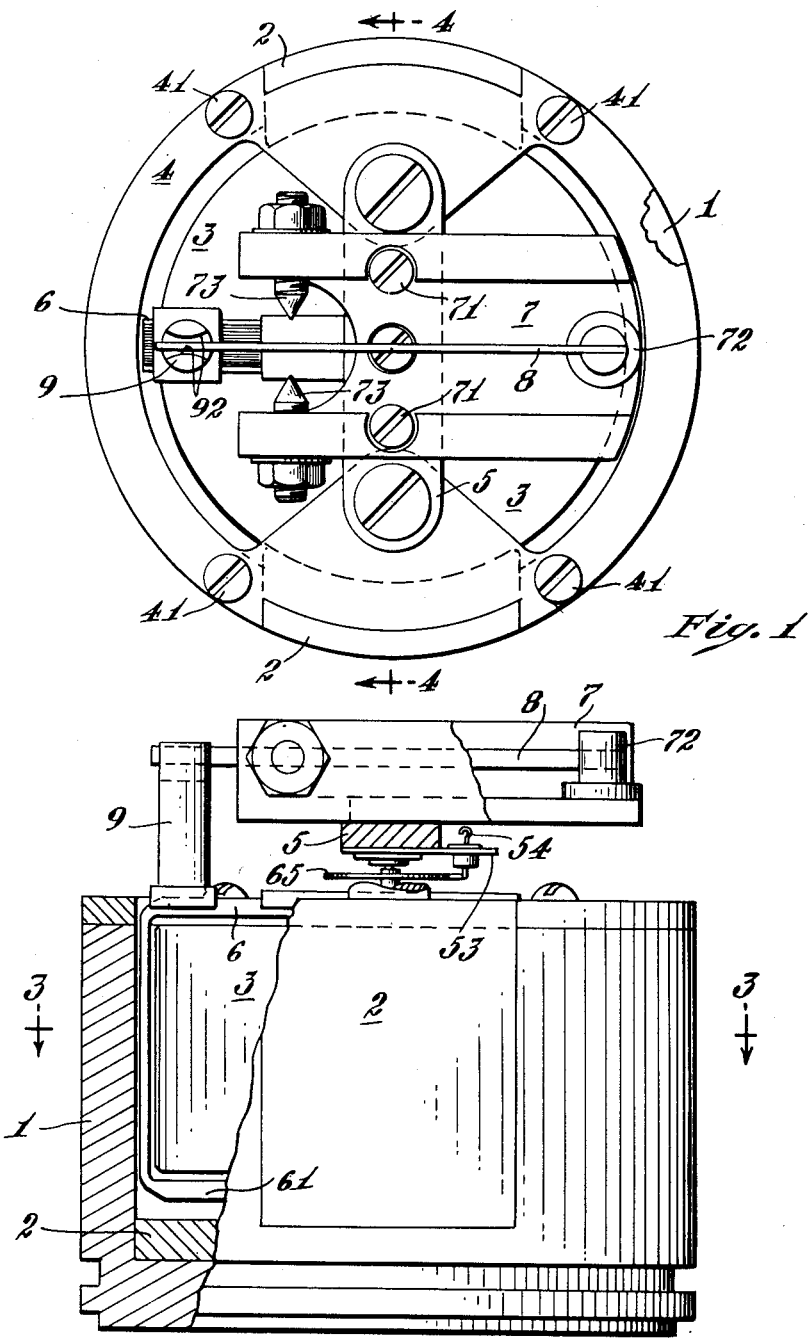

Inventor
Roscoe A. Ammon
by Roberts, Cushman & Grover
Attys

United States Patent Office 2,800,553
Patented July 23, 1957

2,800,553

MOVING COIL MECHANISM

Roscoe A. Ammon, Manchester, N. H.

Application May 2, 1955, Serial No. 505,088

5 Claims. (Cl. 200—110)

This invention relates to moving coil mechanism such as relays wherein a moving coil actuates a movable contact.

In prior moving coil relays the usual galvanometer pointer or needle fixed to a moving coil serves as the moving contact. Connections to the moving coil and contact are provided by coiled hair springs which also provide restoring torque to the moving coil. Such hair springs must be relatively short to avoid undesired resonant vibration, are easily damaged by shock, and are generally unsatisfactory for carrying high currents of relay circuits.

An object of the present invention is to provide an instrument capable of carrying high currents, which is resistant to shock and is not subject to leaf spring resonance problems.

According to the invention the present mechanism comprises a structure providing a magnetic field, a coil pivotally mounted for rotation in the magnetic field, a cantilever spring, preferably substantially straight, anchored at one end relative to said structure, means on the coil engaging the spring to deflect it when the coil is rotated, and a stationary contact disposed to be engaged by the spring. When a small current is applied through the coil the coil rotates, deflecting the spring and causing it to complete a path through the stationary contact. Because the spring is mounted independently of the coil it not only serves as a contactor but provides torque for restoring the coil to normal position after current is cut off from the coil.

Figure 3:
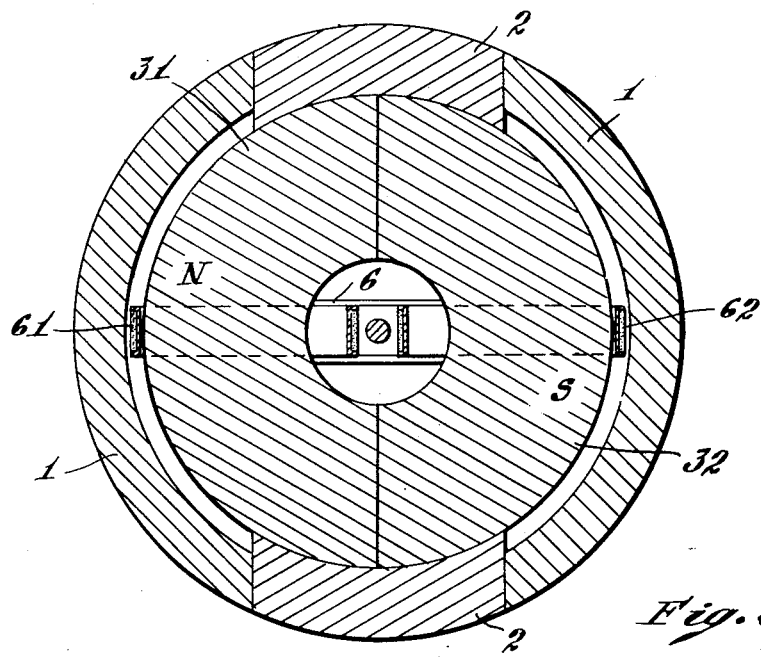
Figure 4:
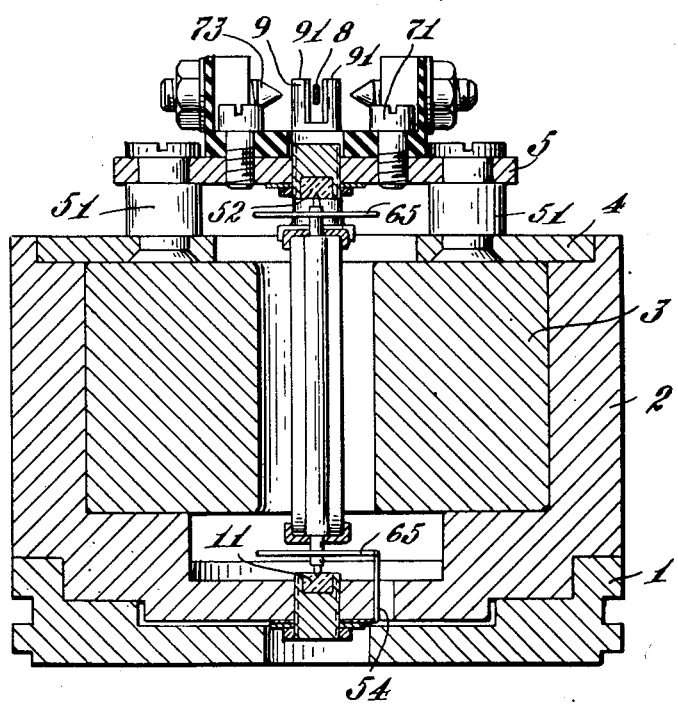
Figure 5:
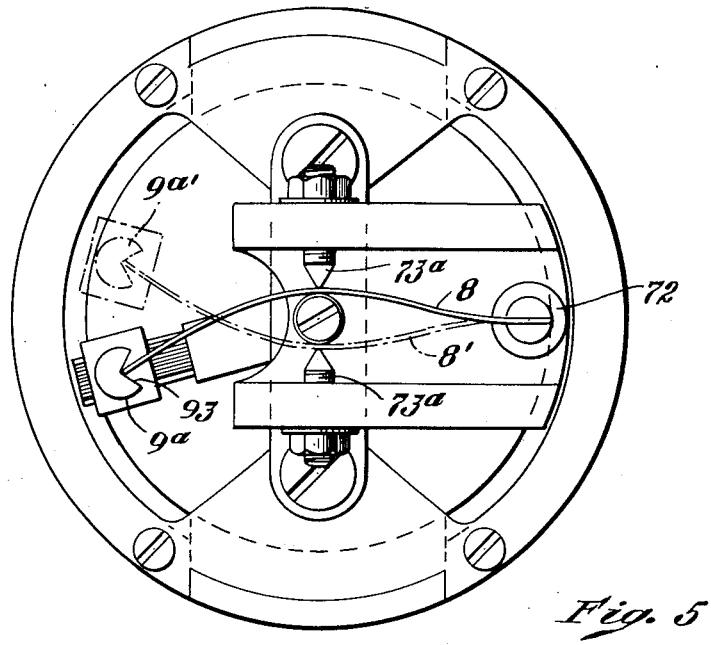
Figure 6:
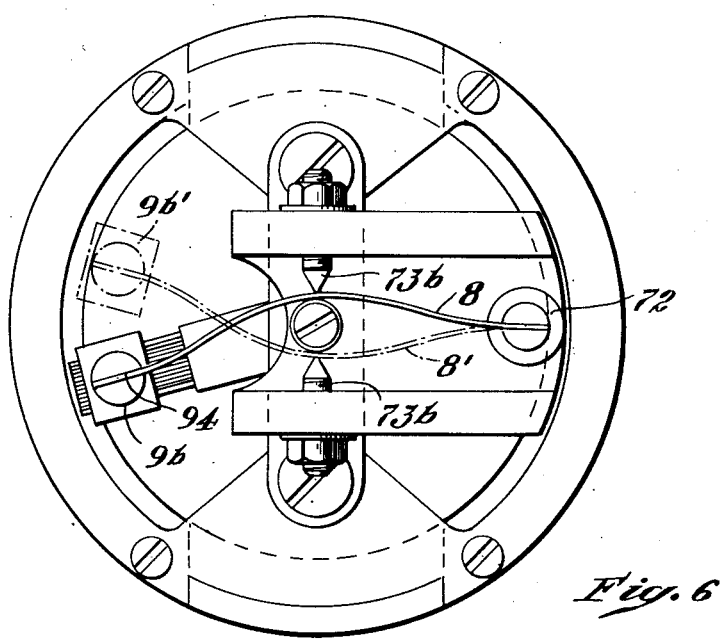

For the purpose of illustration a typical embodiment of the invention is shown in the drawings in which Fig. 1 is a plan view of a sensitive relay;
Fig. 2 is a side elevation with parts broken away;
Fig. 3 is a section on line 3—3 of Fig. 2;
Fig. 4 is a section on line 4—4 of Fig. 1; and
Figs. 5 and 6 are plan views like Fig. 1 showing alternate embodiments of the relay.

The sensitive galvanometer shown comprises a soft iron shoe 1 in which are nested a non-magnetic frame 2 and a core magnet 3 split into two sections 31 and 32. A plate 4 secured to the shoe 1 by screws 41 serves to hold the core 3 and frame 2 nested within the shoe 1 and provides a base for a bearing bridge 5. The bridge 5 is supported by spacers 51 above the plate 4. A conventional jewel bearing 52 is supported in the bridge. A like bearing jewel 11 is supported in the base of the frame 2. The two jewels support a coil 6 having two loops 61 and 62 generally lying in a vertical plane. A supporting arm 53 pivotally secured underneath the bridge 5 carries a coil terminal 54. Between the upper coil terminal 54 and the coil 6 is connected a substantially torqueless hair spring 65. A similar terminal 54 and torqueless hair spring 65 are connected to the bottom of the coil 6 in a conventional manner which permits current to be applied to the coil sections 61 and 62. As shown in Fig. 3 the outer arms of the coil 61 and 62 swing in an air gap between the poles N and S of the core magnet 6 and the iron shoe 1 which forms a magnetic return path between the poles. When current is applied to the terminals 54 the coil is caused to rotate on a vertical axis passing through the bearings 11 and 52 as is well known in the art.

Secured by screws 71 to the bearing bridge 5 is a channel shaped block 7 of insulating material. Secured to the insulating block 7 is a bifurcated terminal post 72 in which is soldered a leaf spring 8 which is substantially straight and of high current carrying capacity. Suitable materials for providing a spring of proper flexibility and low resistance are Phosphor bronze or platinum iridium.

As shown in Figs. 1 to 4 the spring 8 is mounted for deflection in and out of a plane generally passing through the plane of the core or parallel to it and at right angles to the pivotal axis of the coil through the bearings 11 and 52. Spaced from the spring mounting terminal 72 and disposed on opposite sides of the spring 8 are a pair of adjustable stationary contacts 73.

A post 9 of light weight insulating material is secured to one of the coil portions 61 so as to extend upwardly to the free end of the cantilever spring 8. At the top of the post 9 are a pair of bifurcations 91 disposed on either side of the free end of the spring 8 and having curved surfaces 92. The surfaces 92 have a slight clearance from the sides of the leaf spring 8. The normal position of the coil 6 and post 9 is as shown in the drawings.

According to the present invention, when a small current is passed through the coil 6 causing the coil to rotate, one or the other of the surfaces 92 makes a sliding engagement with the free end of the spring 8 and deflects the spring 8 out of its normal position as shown and into engagement with one or the other of the contacts 73 thereby completing a path between the spring terminal 72 and the contacts 73. Because the leaf or cantilever spring 8 may be formed with a high current capacity the path provided by the closing of the contacts is capable of carrying a much higher secondary current than previous meters. In addition flexing of the lever spring 8 by the coil 6 produces a rubbing contact between the spring and the stationary contacts 73 thereby maintaining a clean contact surface on the leaf springs and the contacts.

In the modification shown in Fig. 5 the moving end of the cantilever spring 8 seats in a V-shaped recess 93 of a modified post 9a so that the spring 8 is compressed and bowed urging the post 9a and its supporting coil 6 to the position shown in solid lines. When a small current deflects the coil 6 and post 9a toward the broken line position 9a' the spring is slightly further compressed owing to the fact that the turning radius of the post 9a and coil 6 is shorter than the effective length of the spring 8, i. e., the distance between the anchoring post 72 and the recess 93 is greater than the distance between the pivot bearings of the coil 6 and the recess. The contact 73a engaged by the spring tends to straighten it, however, and when a balance point is passed the spring snaps to the broken line position engaging opposite contact 73a. By adjustment of the contacts 73a the spring, in the absence of current, will assume either position holding the coil normally in one of the positions shown.

In Fig. 6 the moving end of the spring 8 is shown secured in a slit 94 in a modified post 9b so that a cantilever torque is applied to the moving end as well as the end anchored in the post 72. This additional torque assists in producing the snap action which transfers the spring 8 from the one contact 73b to the other as indicated by the broken line position 9b'.

The leaf spring serves not only to complete the aforesaid contact but also to restore the coil 6 to the normal position shown in the drawing. Because the cantilever spring 8 is mounted independently of the coil 6, it is not subject to vibration owing to a loose fit or joggling of the coil in its bearings. The weight of the contact closing structure is not supported by the coil and therefore makes the present relay particularly resistant to high shock and severe vibration. The cantilever spring has substantially less tendency to vibrate at a natural resonant frequency and accidentally close the contacts than the conventional hair springs which are replaced in this relay by the cantilever spring and substantially torqueless connector springs 65.

I claim:

1. In a galvanometer type relay, a structure forming a magnetic field, a coil rotatable in said field from a normal position, bearing means on said structure pivotally supporting said coil, a leaf spring anchored at one end relative to said structure and extending generally parallel to the plane of said coil and at right angles to the pivotal axis of said coil, an insulator on said coil having opposed surfaces for engagement with said spring to cause said spring to deflect on rotation of said coil, and a stationary contact disposed adjacent said spring to be engaged by said spring on deflection thereof, whereby said spring serves to close said contact and to restore said coil to normal position while being mounted independently of the coil.

2. In a galvanometer type relay, a structure forming a magnetic field, a coil rotatable in said field from a normal position, bearing means on said structure pivotally supporting said coil, a pair of coil terminals, substantially torqueless connections between said terminals and said coil, a leaf spring anchored at one end relative to said structure and extending generally parallel to the plane of said coil and at right angles to the pivotal axis of said coil, an insulator on said coil having opposed surfaces for engagement with said spring to cause said spring to deflect on rotation of said coil, and a stationary contact disposed adjacent said spring to be engaged by said spring on deflection thereof, whereby said spring serves to close said contact and to restore said coil to normal position while being mounted independently of the coil.

3. In a galvanometer type relay, a structure forming a magnetic field, a coil rotatable in said field from a normal position, bearing means on said structure pivotally supporting said coil, a pair of coil terminals, substantially torqueless connections between said terminals and said coil, a leaf spring anchored at one end relative to said structure and extending generally parallel to the plane of said coil and at right angles to the pivotal axis of said coil, an insulator on said coil having opposed curved surfaces disposed on opposite sides of said spring, said surfaces being closely spaced from the spring to permit a sliding engagement therewith to cause said spring to deflect on rotation of said coil, and a stationary contact disposed adjacent said spring to be engaged by said spring on deflection thereof, whereby said spring serves to close said contact and to restore said coil to normal position while being mounted independently of the coil.

4. In a galvanometer type relay, a magnetic field structure, a coil movable in the magnetic field from a normal position, a leaf spring anchored at one end relative to said structure, means on said coil engaging said spring to deflect it on movement of the coil, and a stationary contact disposed to be engaged by said spring on deflection thereof, said spring being arranged to restore said coil to normal position, said engaging means normally holding said spring bowed thereby to impart a snap action to the spring on deflection of the coil.

5. In a galvanometer type relay, a magnetic field structure, a coil movable in the magnetic field from a normal position, a leaf spring anchored at one end relative to said structure, means on said coil anchoring the other end of said spring to deflect it on movement of the coil, and a stationary contact disposed to be engaged by said spring on deflection thereof, said spring being arranged to restore said coil to normal position, said anchoring means normally holding the spring bowed and the effective length of said spring being different than the turning arm of said coil whereby on deflection of said coil further bowing is imparted to said spring causing it to engage said contact with a snap action.

References Cited in the file of this patent

UNITED STATES PATENTS

| | | |
|---|---|---|
| 267,711 | Peck et al. | Nov. 21, 1882 |
| 510,003 | Delany | Dec. 5, 1893 |
| 1,527,933 | Staab | Feb. 24, 1925 |
| 1,920,764 | Nickle | Aug. 1, 1933 |
| 1,954,446 | Gauger | Apr. 10, 1934 |
| 1,970,514 | Laubenfels | Aug. 14, 1934 |
| 2,395,669 | Kelly | Feb. 26, 1946 |
| 2,512,306 | Clark et al. | June 20, 1950 |
| 2,717,297 | Walker | Sept. 6, 1955 |
| 2,774,843 | Kenick | Dec. 18, 1956 |